May 8, 1934.  E. HAUGEN  1,957,588
TILTING MECHANISM FOR DUMP CARS
Original Filed Aug. 24, 1931
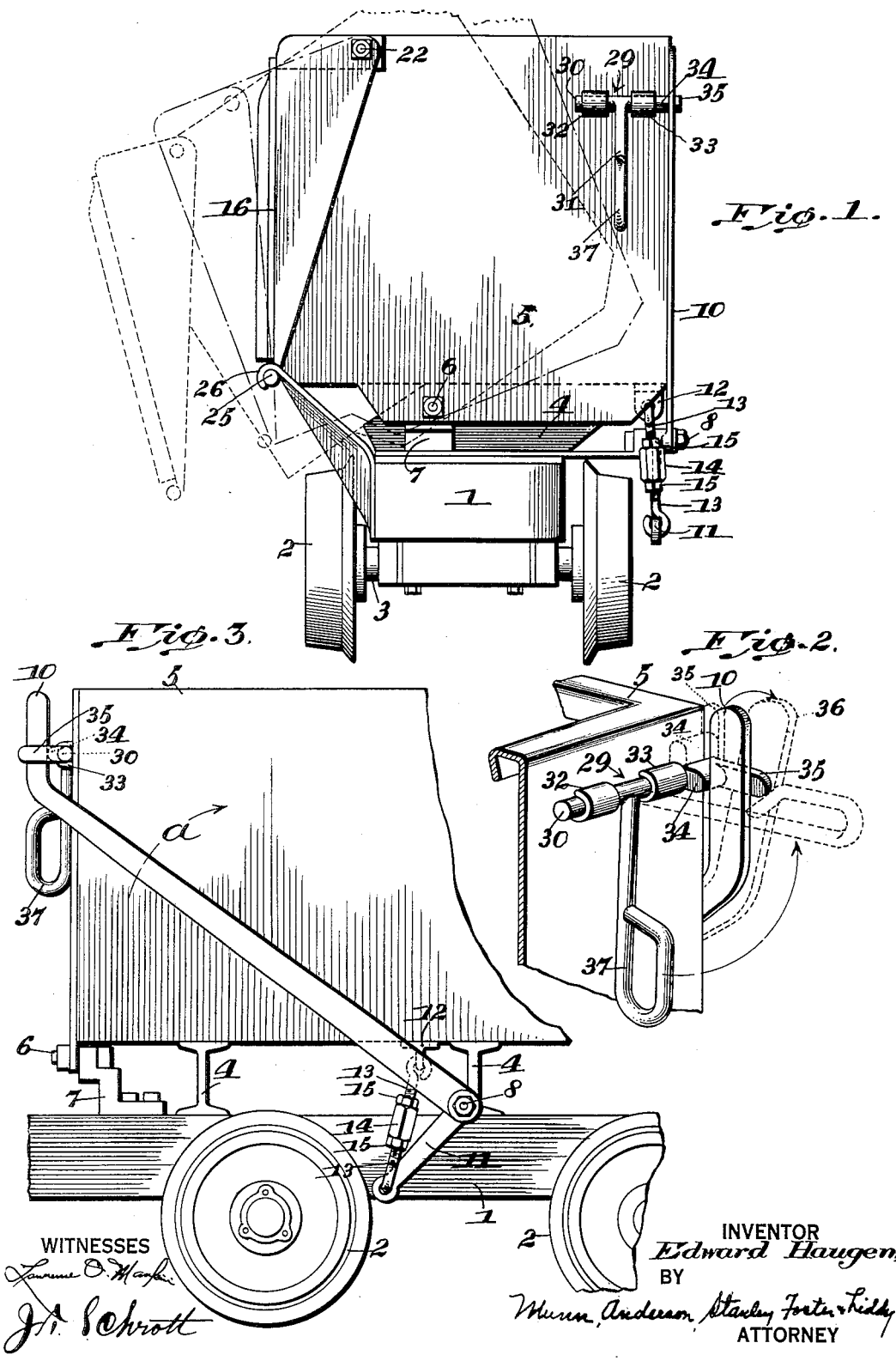
INVENTOR
Edward Haugen,
BY
ATTORNEY
WITNESSES Patented May 8, 1934

1,957,588

UNITED STATES PATENT OFFICE 1,957,588

TILTING MECHANISM FOR DUMP CARS

Edward Haugen, Wallace, Idaho, assignor to Coeur d'Alene Hardware & Foundry Company, Wallace, Idaho, a corporation of Idaho Original application August 24, 1931, Serial No. 559,008, now Patent No. 1,904,453, dated April 18, 1933. Divided and this application December 27, 1932, Serial No. 649,053

6 Claims. (Cl. 105—274)

This invention relates to improvements in dump cars, the improvement residing particularly in the tilting mechanism, and its objects are as follows:—

First, to provide a dump car in which the tilting mechanism is so organized that in addition to its function of tilting the car body with respect to the frame it will also lock the body on the frame so that there will be absolutely no relative movement when the body is in the final loading position whether at rest, or in motion.

Second, to incorporate a turnbuckle or some equivalent take-up means in the linkage of the tilting mechanism for the purpose of adjusting out, so to speak, any loose motion that may develop in said tilting mechanism, so as to make it possible to clamp the body hard down upon the frame when in its final upstanding position.

Third, to provide a device for locking the dumping lever, that is to say a latch or detent for holding the dumping lever while the car is in the upright position, the only requirement pursuant to releasing the lever and permitting it to spring clear by virtue of a degree of inherent resiliency being to turn the latch or detent in a prescribed direction.

Fourth, to provide a turnbuckle, or its equivalent as mentioned above, as the connecting link between the tiltable body and lever arm of the frame for the purpose of so adjusting the body as to tightly engage the locking means virtually carried by the door and frame, this locking means being one of the subjects of Patent 1,904,-453 of Edward Haugen, dated April 18, 1933 and of which this is a division.

Other objects and advantages will appear in the following specification, reference being had to the accompanying drawing in which Figure 1 is an end elevation of one type of side dump car, particularly illustrating the tilting mechanism and the locking device therefor.

Figure 2 is a detail perspective view of the lever locking device, illustrating how the inherent resiliency of the lever causes it to spring clear of the latch when the latter is turned a prescribed distance.

Figure 3 is a partial side elevation of the dump car in Figure 1, viewing the latter from the right side and showing the relationship of the locking device to the dumping lever.

The invention herein specifically disclosed is concerned with the tilting mechanism of the car body of the foregoing patent. This tilting mechanism includes a lever locking device and further includes a turnbuckle or equivalent take-up means for the purpose of so stabilizing the car body that it will not be subject to rattling and other idle motion with respect to the frame when once brought to the final erect position, whether the car is in motion or standing still.

Reference is made to the drawing. A frame 1 is carried by suitable car wheels 2 and axles 3, these parts constituting a truck. The frame 1 carries a plurality of supports 4 (Fig. 3) upon which the car body 5 is tiltably mounted upon pivots 6 which may either be combined with pivot blocks 7 (Fig. 3) mounted on the frame 1 or arranged in any other preferred manner.

A pivot 8 (Figs. 1 and 3) provides the support of a dumping lever 10. The lever assemblage includes an arm 11, and this is joined with a block 12 on the nether side of the car body 5 by a connection which consists of a two-part link 13, the adequately oppositely threaded ends of which are joined by a nut 14 which, together with the two-part link constitutes a turnbuckle. Each of the links 13 also carries a lock nut 15. The lock nuts are driven hard against the nut 14 so as to fix a given adjustment.

Thus far it will be understood that when the dumping lever 10 is swung in the clockwise direction (arrow $a$, Fig. 3), the car body 5 will be tilted on its pivotal axis 6 (Fig. 1) so that the contents will be discharged. It will be observed that when the car body 5 is brought to the ultimate upright position (Fig. 1) it rests upon the supports 4. After long and severe use there is a possibility of looseness developing in the pivots 6 or somewhere in the linkage between the dumping lever 10 and the car body 5. In such an event the turnbuckle 13, 14 is employed to adjust out the looseness. The effect of the adjustment will be to shorten the two-part link 13 so that when the lever 10 is in the locked position (Fig. 3) the car body 5 will be drawn down hard against the supports 4, in other words, virtually clamped down on the frame.

The car body 5 has a side opening (not shown). This opening occurs on the left side of Figure 1. It is adapted to be closed by a door 16. This door is movably carried by the car body, the nature of its carriage being that of pivotal mounts 22 which occur at the top of the car body and door. The door opens and closes automatically, and a feature of it is that it is substantially unfettered as fully brought out in the copending application.

It includes locking means which come into play of their own accord when the movement of the body toward the erect position is about to end. The locking means automatically disengages at the beginning of the dumping movement of the car body. The action at this time is depicted by the broken line positions in Figure 1. The locking means referred to comprises a lug 25 on the free end of the door 16 at each end and a companion hook 26 fixed on the frame 1. When the car body 5 finishes its contacting movement toward the right the lug 25 moves up under the hook 26 and establishes a lock. Conversely, when the car body begins its tilting movement toward the left the lug 25 departs downwardly away from the hook.

In some cases the nature of the supports 4 (Fig. 3) may be such that the car body 5 cannot be brought down upon them when assuming the erect position. For example, instead of the tops of the supports 4 being level across they may slant downwardly from a point immediately above the pivots 6. In an instance such as this it is possible that looseness may develop between the lug 25 and hook 26. Again the turnbuckle 13, 14 can be brought into play to reestablish the stability of the car body with reference to the frame 1.

An adjustment of the nut 14 in the proper direction will shorten the two-part link 13 as before. The effect of this is to superficially swing the car body 5 on its pivots 6 until the lug 25 is brought up hard within the confines of the hook 26. Any loose play is thus adjusted out, and the car body will be held firmly upon the frame so that there may be no looseness as brought out before.

Reference is again made to the dumping lever 10. This is provided with a locking device 29 which engages and holds the lever in one of its positions so as to prevent movement of the lever on its pivot 8 and a consequently inadvertent tilting of the car body 5.

This locking device comprises a bolt 30 (Fig. 2) which can be turned by a handle 31 but is not adapted to be slid in its supports 32, 33. The handle is situated between the two supports and is held substantially against the support 33 by a cam 34 on the bolt immediately outside of the support 33. In other words, the handle 31 and cam 34 are close to the support 33 and so prevent endwise movement of the bolt 30 but without impeding the turning of the bolt in order to release the lever 10.

This lever has a certain amount in inherent resiliency. When the handle 31 is down (full lines, Fig. 2) the cam 34 presses against the near edge of the lever 10 while an extension 35 of the cam keeps the lever close to the car body out of the way of any obstruction which might be encountered in tunnels or along the tracks. The cam comprises means which actually jams between the lever and the body, its action being that of a wedge which is capable of a progressive tightening. The extension 35 resists the outward springing tendency of the lever 10 but when the handle 31 is lifted to the dotted line position (Fig. 2) by which act the cam 34 and extension 35 are turned to the upright position, the dumping lever springs clear to the dotted line position 36 from which position it is free to be swung clockwise (arrow a, Fig. 3) preparatory to tilting the car body 5 on its axis.

At this point another purpose of the adjustable link is to be observed. The degree of pressure of the free end of the lever 10 against the cam 34 can be governed by the particular adjustment of the link. When the parts 13 are drawn relatively close the lever will bear harder against the cam than if they are not so close. This feature is a contribution toward the prevention of loose motion described in the statement of the second object of the invention, in that it serves to hold the lever tightly.

It is to be observed that the handle 31 has a rather large bend 37 (Fig. 2). This provides an adequate handhold enabling the operator to push the cam 34 into the locking position of the device 29, providing that the lever 10 has first been brought to the full line position (Fig. 2) where it can be engaged by the cam 34 and extension 35. The purpose of the cam 34 is to prevent any loose pivotal play of the lever 10, this being accomplished by its bearing against the near edge of the lever as already brought out. After the lever 10 has been disengaged from the locking device 29 the handle 31 will fall due to its weighted end.

I claim:—

1. A dump car comprising a truck, a body pivotally mounted on the truck, a lever movably carried by the truck having means in connection with the body for tilting the body on its pivotal axis, a cam, and means on the body carrying the cam being movable to bind the cam against the lever to prevent loose pivotal play while the body is in the normal position.

2. A dump car comprising a truck, a body pivotally mounted on the truck, a lever rockably carried by the truck having means in connection with the body for tilting the body on its pivotal axis, said lever having a degree of inherent resiliency tending to spring it from the body, a cam and an extension on the cam, and means carrying both the cam and extension being movable to bind the cam against an edge of the lever and dispose the extension beside the lever to simultaneously lock the lever against rocking and springing movements.

3. A dump car comprising a truck, a body pivotally mounted on the truck, a lever movably carried by the truck having means in connection with the body for tilting the body on its pivotal axis, locking means to lock the lever against movement while the body is in a normal position on the truck, a bolt by which said means is carried, means by which the bolt is turnably mounted on the body, and a handle on the bolt being operable to engage the locking means with the lever and maintain it in such engagement.

4. In a dump car comprising relatively stationary and movable parts, said parts consisting of a truck and a body pivotally mounted on the truck, a turnable lever lock carried by one of the parts being turnable into locking and release positions, a dumping lever carried by the other part and having a degree of inherent resiliency tending to spring it out from the first part, said lever being adapted to be flexed toward said first part and held behind the lock when the lock is in the locking position, a connection between the lever and said first part, and means to turn the lock into the release position whereat the lever springs out.

5. A truck and a body pivotally mounted thereon, a lever to tilt the body and means by which the body is rockably carried by the truck, a cam, means on the body carrying the cam said means being movable to bind the cam against the lever while the body is in one position on the truck, a connection between the lever and the body, and means embodied in the connection to adjust the length of the connection and thereby to vary the pressure of the lever against the cam.

6. A dump car having a truck, a body pivoted on a longitudinal axis on the truck and an operating lever pivoted on a transverse axis on the truck; means on the body to jam between the free end of the lever and the body to hold the lever tight, and connecting means between the lever and body, having an adjustment for regulating the degree of jamming.

EDWARD HAUGEN.